Jan. 6, 1948.    H. D. VAN SCIVER    2,433,967
METHOD OF AND APPARATUS FOR WELD CONTROL
Filed Feb. 28, 1944    2 Sheets-Sheet 1

INVENTOR
Herbert D. Van Sciver.
BY John P. Fairbox
ATTORNEY

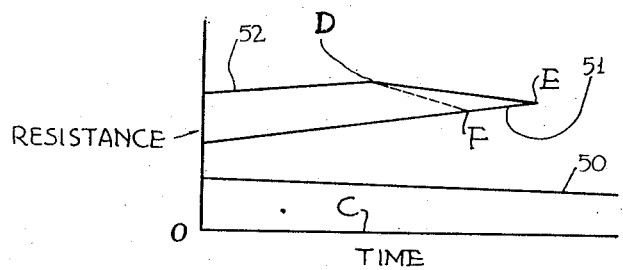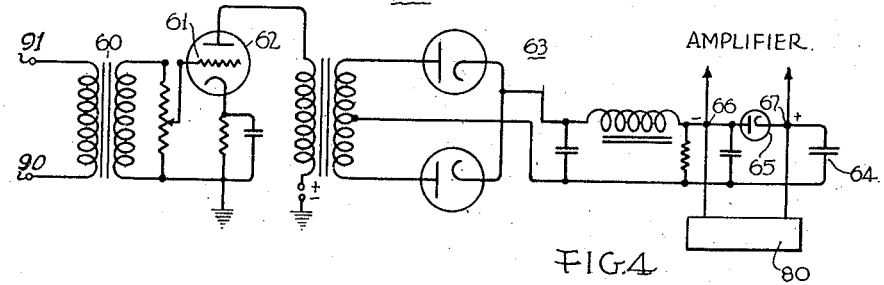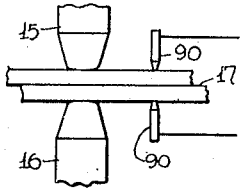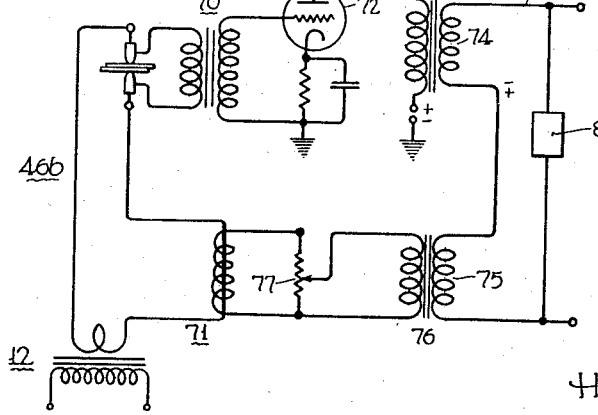
INVENTOR
Herbert D. Van Sciver
BY John P. Jarboe
ATTORNEY Patented Jan. 6, 1948

2,433,967

UNITED STATES PATENT OFFICE 2,433,967

METHOD OF AND APPARATUS FOR WELD CONTROL

Herbert D. Van Sciver, Merion, Pa., assignor to The Budd Company, Philadelphia, Pa., a corporation of Pennsylvania Application February 28, 1944, Serial No. 524,243

18 Claims. (Cl. 219—4)

1

This invention relates to a method of and apparatus for weld control and has primary application to spot resistance welding, although applicable to other types of resistance welding, such as seam and pulsation welding.

I have discovered that the completion of each spot weld is accompanied by a determinate and differentiating change in voltage across the weld. According to the method of my invention, I make use of voltage manifestations of such differentiating changes to delimit the energy through which the weld is achieved.

By the term "completion" I mean the attainment of the fusion of substantially that minimum amount of metal found by experiment necessarily fused to attain that strength of weld which is desired. These amounts differ with different strengths of welds in the same workpieces but are determinate for each strength of weld. Such determinate and differentiatable fusions I have found to be accompanied by equally determinate and differentiatable drops of voltage across the weld. According to my method, I control the strength of the weld by means of determination of the voltage drop or resistor change at weld fusion.

Today's standard welding practice for different metals (alike for metals of high conductivity as, for example, aluminum, brass, and for metals of relatively low conductivity, as for example, ordinary steels and stainless steels) consists in completion of welds for each determinate thickness of metal, number of laps of such thickness or combinations of thicknesses, and chosen electrode size, electrode pressure and welding current—in completion of such welds by fusing substantially but that minimum amount of metal which when solidified will afford the welds made the maximum attainable strength consistent with the avoidance of undesired effects upon the metal in and at the region of the weld nugget. Such a weld is termed a "normal" or "full" weld.

Delimiting of the energy required for completion of its required fusion is in standard practice attained by coordinating the time of application of the welding energy with the rate of introduction of energy, that is, in coordinating the number of cycles of a given alternating current weld with the welding current. I have discovered that the drop in voltage across the normal or full weld increases until its completion, and that at completion the voltage drop has reached substantially a determinate maximum. I make use of manifestation of this maximum drop at completion of the normal weld to insure normal welds.

2

Outstanding objects of my invention are first, to devise a method and an apparatus through which fabrication by spot welding can be attained with an assurance had at the time the welds are being made that each single weld is of the strength desired and free from defects in or around it; second, to produce better non-automatic devices for assuring good welds; and third, to produce an entirely automatic such device. I aim to achieve the assurance of uniformly good welds with a far greater accuracy and certainty than has been the case hitherto. I purpose to render both the method and apparatus of my invention as adaptable as possible, e. g., adaptable to existing timer circuits as well as to special circuits.

Other objects will become apparent upon consideration of the specific form of the invention hereinafter described and shown in the accompanying drawing, in which:

Figure 3 is a curve showing heat variation at the weld with time;

Figures 4 and 5 illustrate diagrammatically circuits which may be used in connection with the amplifying means; and Figure 6 is a detail of a modified workpiece contact.

Figure 1:
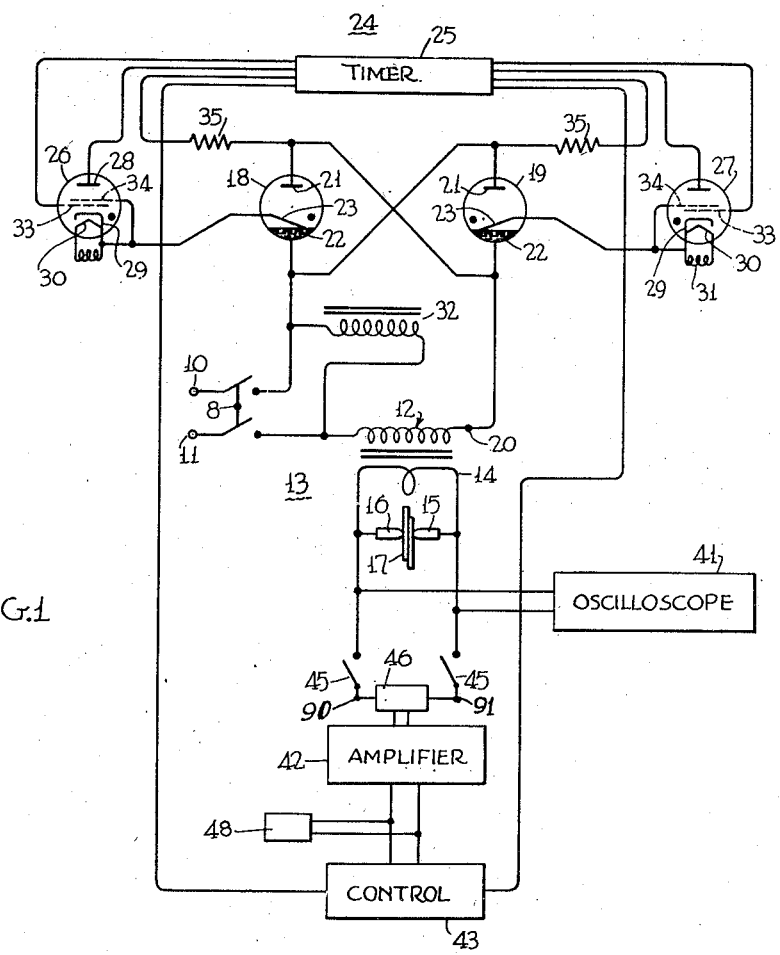
Figure 1 is a wiring diagram of a circuit showing the system of welding control as utilized in the method.

Referring to Figure 1 of the drawing, the numerals 10 and 11 indicate source terminals of alternating current which may be of usual 60 cycle frequency and of proper commercial voltage for resistance welding. The terminal 11 leads through the main switch 8 to the welding transformer 13 having a primary 12 connected to the switch 8 and secondary 14 connected through electrodes 15 and 16 to the workpiece 17, which may be of any metal including stainless and carbon steels and aluminum. The workpiece is illustrated in the usual form of two contiguous plates having a common interface at which, during the flow of current between the electrodes, heat develops to the temperature sufficient to fuse the material into a bonding nugget, thus forming the usual resistance type weld. The terminal 10 leads through main switch 8 to means for utilizing both alternations of the flow cycle of the alternating current, consisting in the ignitrons 18 and 19 inversely connected in the circuit between the terminal 10 and the point 20 at the far side of the primary of the welding transformer 13 from the source terminal 11. Each ignitron includes an anode 21 and mercury-cooled cathode 22 and igniter elements 23, the tube container being gas-filled. To obtain the inverse connection, the anode 21 of the tube 19 is connected to the cathode 22 of tube 18, and this cross connection is made a part of the circuit and the terminal 10. Also, the anode 21 of tube 18 is connected to the cathode 22 of tube 19, and this cross connection is made a part of the circuit leading to point 20 and the welding transformer 12. Thus current of a given half-cycle of voltage form entering at the source terminal 10 may follow the circuit to the anode of tube 19 and thence to the welding transformer 13 and in the succeeding half-cycle the current will be from the terminal 11 through the coil 12 of the welding transformer to the anode 21 of tube 18 and thence to the terminal 10.

In accordance with ignitron construction, current flow through these tubes is regulated by an igniter, such as 23, of the tubes 18 and 19 so that when sufficient voltage is impressed on the igniter it operates to break down the resistance of the gaseous atmosphere in the tubes and permit a flow of current from the anode to the cathode, this flow continuing until the potential of the source current equals zero. Means for controlling the igniters is provided in the accessory control unit generally indicated by the numeral 24 and including a timer mechanism 25 associated with thyratrons 26 and 27 and interconnecting circuits. Each thyratron, as 26, for example, is formed of a gas-filled container containing an anode 28 and an indirectly heated cathode 29 and heater filament 30 connected to the secondary 31 of the filament transformer 32 and a control grid 33 and a screen grid 34. Of these thyratron elements, the anode and control grids are connected to the timer unit and the screen grids, and the cathodes are connected to the igniters 23. Also, the anodes of the igniters 18 and 19 are connected through resistors 35 to the timer unit.

The timer as employed in this circuit is of conventional form, such as disclosed in the publication "Electronic Control of Resistance Welding," by George M. Schute and published by the McGraw-Hill Book Company in 1943, and in various publications and patents. Such timer is preferably of the synchronous type, that is, the timing or control of the welding circuit keeps accurately in step with the alternating current voltage wave subject to such controls as may be necessary to modify the heat energy supplied or to compensate for voltage variation as described in the patent hereinafter referred to.

Figure 2:
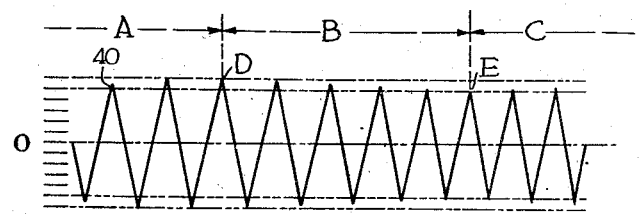
Figure 2 is a copy of an oscillogram showing one type of variation of voltage at the electrode terminals occuring during a complete welding operation.

I have found by experimentation and laboratory tests that the voltage across the workpiece consisting of two plates, for example, having a common interface, is substantially constant prior to initiation of fusion formation at the interface with a rising tendency due to absorption of heat by the workpiece but changes signally by a definite and measurable amount as complete fusion develops. In other words, I have discovered that prior to the initiation of fusion, the resistance at the interface is substantially an increasing linear function of the time, but between the time of initiation and completion of a normal weld the interface resistance will drop substantially to zero. This is illustrated in Figure 2 between points D and E as a voltage drop, and in Figure 3 as a drop in resistance indicated for a given fusion point as will be more fully described hereinafter. If this voltage be examined by an oscilloscope, for example, a type of curve 40 as shown in Figure 2 develops, this curve 40 consisting of three sections, A, B, and C, section A indicating the substantially constant voltage alternation prior to the commencement of fusion, and section B the voltage change downward to the section C after complete fusion. The curve as shown is applied against an abscissa of time and an ordinate of voltage giving the amplitude of the voltage between electrodes. It will be seen on inspection of this curve that there is a continuous decrease of the amplitude of voltage between the electrodes 15 and 16 after point D is passed. The point E on the curve marks the point of substantial completion of a substantially normal weld. At this point the drop is substantially a maximum. Continuing the application of energy beyond this point does not materially change the drop though it may rise slightly, marking this point as a reversal.

In order to utilize this concept in the method which I employ, the pilot circuit of an oscilloscope 41 is connected directly across the electrodes 15 and 16 and maintained so connected, so that the pattern of the voltage variation, such as illustrated in Figure 2, may be currently visually apparent to the operator of the welding mechanism during welding operations. In addition to connection to the oscilloscope as shown, the electrodes 15 and 16 are also connected to a comparator unit 46 wherein the change of voltage due to weld fusion for any given weld is automatically determined. To this comparator 46 is connected an amplifier 42 of any conventional type for amplification of the voltage change developed between points D and E in the curve 40 of Figure 2. Suggested forms of connections to amplifying circuits are illustrated in Figures 4 and 5. From the amplifier 42, the purpose of which is to develop adequate energy to operate the control device, conductors are led to a control unit 43 which may consist merely in a relay mechanism or a thyratron subject to grid control in the usual manner. The control functions through direct connection to the timer to modify or open the circuit of the timer so as to break the circuit through the rectifying ignitrons and open the welding circuit.

Reference is made to Figure 3 for curves illustrating variation of electrical resistance at the weld point for a test workpiece. Curve 50 indicates the approximate electrical resistance between the two electrodes and the adjacent metal surfaces of the workpiece, that is, the interface between these two elements showing a decline with time. Curve 51 indicates the approximate variation in resistance in the body of the workpiece exclusive of the interfaces in accordance with variation in time. It will be noted that the resistance tends to rise as the workpiece becomes heated and that this rise is approximately linear with time. Curve 52 is shown as a solid and dashed line, the two sections indicating the general magnitude and direction of change of resistance at the interface between the surfaces of the plates. As in the case of curve 50, this curve also tends to decline with time.

Considering these curves as an example only of the resistance conditions for a given workpiece, it may be assumed that the metal at the interface begins to fuse at the point D and, consequently, a decrease in resistance occurs as the nugget of molten metal forms, the interface resistance approaching its zero value, as resistance 51 approaches a maximum. As a matter of fact, the approach to zero may not be complete, due to the fact that the molten metal has a slight variation of resistance over that of solid metal. However, the general shape of the curve is indicative of the drop of resistance which occurs when the heating energy arrives at the melting point of the metal interface. Obviously, the shape of the curve D—E will vary with the thickness of the plates, with the voltage supply, with the metal or other material forming the workpiece and other variable variations such as D—F occurring. The decrement D—E is the physical feature arising from the drop in voltage between the electrodes which is utilized as hereinabove described to open the heating circuit. It is pointed out that for a given change in resistance from point D to E in Figure 3 the percentage relationship relative to the total value of the resistance at this point decreases with the time. Change due to fusion may vary not only with the thickness of the material but with the number of plates which may be involved in the welding operation.

In Figure 4 I have illustrated a branch translating circuit 46a adapted to be connected across the secondary of the welding transformer for translating the voltage drop occurring in the voltage impulse to an impulse effective in a signal or amplifier 42 of Figure 1. Incorporated preferably in this circuit 46a is an automatic voltage control functioning to bring the signal to a reference value corresponding to the inter-electrode voltage prior to fusion at the workpiece weld point in preference to a voltage change. From the amplifier the impulse may be led to the alternative signal 48 of Figure 1 or to the control circuit 43. This translating circuit 46a includes the transformer 60 having a secondary with one end grounded and the other one connected to the grid 61 of an amplifying tube 62. The plate current of this amplifying tube is transformed into a rectifier circuit 63 and the rectified current passed to a capacitor 64 having in series therewith a rectifier 65, such as a diode. From points 66 and 67 on either side of the rectifier, taps are taken to a direct current amplifying circuit or sensory signal 80 as hereinabove referred to.

The action of this circuit is controlled by capacitor 64. When the welding voltage appears at the welding transformer, the capacitor is charged through the rectifier 65 to the maximum voltage, as indicated in the A section of the curve of Figure 2. On fusion and drop of voltage to E (Figure 2), the capacitor discharges down to the new voltage and this discharge is applied to an indicator or used to operate the power cut-out.

With this circuit, particularly when employed in connection with effective volume control and heat energy compensation such as that shown in the patent of Robert S. Phair No. 2,330,377, titled "Electrical control system" and copending application of Edwin M. Callender on "Voltage compensator," exceptionally satisfactory control is assured.

In Figure 5, also, there is illustrated a modified means 46b of translating the voltage drop at weld completion to an amplifier circuit. In this particular modified circuit, the numeral 70 indicates the impedance matching transformer from the welding electrodes, and the numeral 71 a current transformer from the secondary of the welding transformer 12. The voltage of transformer 70 from the point of weld is amplified by tube 72 and led through transformer 73, the secondary 74 of which is wound so as to oppose the connected secondary 75 of transformer 76 leading from the terminals of the secondary of current transformer 71. A variable resistor 77 permits adjustment of the two opposed secondaries 74, 75 so that at normal weld current, the voltage in the circuit 78 including the secondaries 74, 75 is approximately zero. However, on a drop occurring in the welding circuit, balance between the secondaries 74, 75 is disturbed and voltage is established in conductor 78, this being amplified in the usual manner or supplied directly to signal 81.

The circuit 46b affords considerable compensation without the usual voltage compensation and is particularly effective in conjunction with compensator means as above referred to.

My method of weld control as carried out on the apparatus hereinabove described comprehends among others the following steps: When a weld is about to be made, the operator closes main switch 8 thus making connection from the alternating current source through terminals 10 and 11 to the rectifying circuit and the welding transformer 13. Alternating current properly transformed is supplied to the workpiece 17 through the electrodes 15 and 16 at a determinate initial voltage, as shown in the A section of curve 40 of Figure 2. The heat resulting from the current flow in the workpiece accumulates until at the point D initiation of fusion is reached and a weld nugget commences to form at the interface in the workpiece, thereby causing rapid, substantial and observable percentage drop in the voltage between the electrodes.

With the percentage drop in voltage as indicated, the operator may follow one of two diverse method steps. In the one case, the connection to the control mechanism 43 may be broken, as by switch elements 45, and the operator may proceed to currently adjust the heat energy appliance solely upon the visual evidence of the oscilloscope 41. In observing the oscilloscope, if it be found that the point E, definitive of a determinate voltage drop, does not appear during the time interval as set by the timer, then the timer may be manually adjusted by the operator until the point E secures a visible indication. In such case, the timer is set to open the welding circuit a short interval after the point E, of at least one cycle. On the other hand, if inspection of the curve on the oscilloscope reveals that the point E occurs too long before the termination of the time interval as set by the timer, then the timer may be manually adjusted to reduce the time used to an interval approximately one to three cycles after the point E. In either case, the adjustment is such that the ultimate length of the weld as determined by the timer is just beyond the point at which the determinate voltage drop incident to substantially complete fusion occurs. Thus the operator currently utilizes the oscilloscope maintained connected across the electrodes as a means for setting the timer at the interval of most efficient use for the particular materials involved in the welding operation.

The nature of the oscillographic manifestation may be varied extensively. It may be a visual screen record, a line trace of the voltage waves on a tape, a developed photographic negative trace, a memory record on a magnetic tape, an oscillographic record, or other known device. So, also, the voltage connection may be directly to the work plates instead of directly to the electrodes, as shown by contactors so as to eliminate the contact resistance between the electrodes and workpiece in the control circuit 90 of Figure 6.

Alternatively, the operator may depend primarily upon the automatic control feature 43 in conjunction with the timer 24. In utilizing this alternative method, the switches 45 and the control circuit are closed, so that the voltage change occurring on the completion of the weld is transmitted to the amplifier where, in magnified value, it is used to control mechanism for interrupting the igniter circuit of the timer. Should, with this arrangement, the control normally operate subsequent to the completion of the timer interval, then adjustment of the timer would be made so as to extend the timer interval beyond that of the control time period, so that the timer would provide a terminal or final means of opening the welding circuit which ordinarily would be opened prior to the timer interval by the control mechanism 43.

In connection with the second alternative method of welding control as above described, it is apparent that the oscilloscope 41 may be used as a check or it may be disconnected from the circuit and dependence given entirely to the automatic control mechanism.

It may be desirable, also, to obtain a permanent record of the voltage curve form as suggested in connection with the use of the first-mentioned method, using a photographic means, for example. This may be done in conjunction with the automatic control feature, so that the operator may have not only a continuous control over the welding time period, but also, a permanent record of the voltage variation at the weld point. For example, if on inspection of a record in a given run of welds, it is found that the heat energy as set by the timer is excessive, adjustment may be made of the timer to meet more closely the energy requirement.

It is pointed out that certain conditions affecting weld quality such as electrode tip conditions, electrode or workpiece surface conditions, poor fit of equipment, distance between electrodes, the distance between workpiece plates or parts and the proximity to other welds are detectable by this described method and are automatically compensated for by the control means described. Current or line voltage variations are taken care of by the voltage drop compensator as described in patent and application hereinabove referred to. While the phenomenon occurring at the weld point at fusion is a resistance change, it is convenient to refer to this change in terms of voltage with the necessary assumption that current is kept substantially constant.

Description has been made of methods of weld control which may be preferred, but it is apparent that minor modifications may be made in accordance with the specific requirements of the materials being welded and their operating conditions; and hence no limitation is implied in the disclosure as made other than may be required by the scope of the claims hereto appended.

What is claimed is:

1. A method of weld control for multiple resistance welding, which comprises connecting a workpiece in a welding circuit having welding energy control means, applying a welding voltage through the workpiece until the heat energy develops such fusion of the material as results in a substantial percentage voltage change at the weld point, translating said percentage voltage change into a power manifestation, and adjusting the time limit of the energy control means in accordance with the average time period of energy flow for each weld to the point of said power manifestation.

2. A method of weld control for multiple resistance welding, which comprises connecting a workpiece in a welding circuit having associated therewith means to control the heat of fusion, applying a welding voltage through the workpiece until the heat energy develops such degree of fusion of the material as results in a predetermined percentage of voltage change across the weld, translating said percentage voltage change into a manifestation of its occurrence, and adjusting the heat of fusion until the time of the weld consistently includes substantially the point of first occurrence of said predetermined voltage change manifestation.

3. In weld control apparatus for resistance welding of a workpiece at a series of points having different electrical contact resistances, a welding transformer, a power source connected to the primary of said transformer, welding electrodes connected to the secondary of said transformer and adapted for inclusion of a workpiece, and means connected in said secondary circuit and automatically adjustable to weld point electrical resistance variation between welds for disconnecting the power source from said transformer primary at the point of completion of a weld through said workpiece whereby the welds obtained are substantially independent of contact resistance variation between welds.

4. In weld control apparatus for resistance welding of a workpiece at a series of points having different electrical contact resistances, a welding transformer, a power source connected to the primary of said transformer, welding electrodes connected to the secondary of said transformer and adapted for inclusion of a workpiece, and means connected to said electrodes automatically adjustable to resistance changes between the electrodes resulting from changes in placement of the workpiece at different weld points for disconnecting the power source from said transformer primary at the point of completion of a weld through said workpiece whereby the resulting welds are substantially independent of secondary circuit resistance variation.

5. In an electrical control system, a power source, a variable load subject to voltage change from an initial voltage connected to said source, switch means between the source and load, and control means dependent on voltage change at the load and independent of initial load voltage for actuating said switch means, said control means comprising a capacitor connected to said load for receiving a charge corresponding to the initial load voltage, a discharge circuit connected to said capacitor including power mechanism for actuating said switch means, and means for channeling the capacitor discharge through said power mechanism.

6. In an electrical load control system dependent on load voltage change, a capacitor subject to discharge on load voltage change only, a load circuit connected to said capacitor, means for charging said capacitor to a voltage directly related to load voltage, control means for applying said capacitor discharge to the actuation of a power unit, and means connected to the capacitor, the load circuit and control means for receiving the discharge of said capacitor only on load voltage drop and for transmitting said discharge to the control means whereby the control means is energized to actuate said power unit.

7. In an electrical control system dependent on change of average alternating current voltage at the load, means connected to said load for establishing a rectified initial voltage thereof, a capacitor adapted to receive charge at said rectified voltage, an electrical power unit including a power operated mechanism, a control circuit connecting said power unit and capacitor, said circuit including a rectifier adapted to transmit current from the capacitor to the control circuit only on change of load voltage.

8. In an electrical control system dependent on load voltage change, a load, voltage means connected in parallel to said load for developing automatically a voltage proportional to the maximum load voltage obtainable prior to load change, and circuit means connected to said voltage means for actuating power change mechanism on a predetermined voltage drop from maximum voltage of said voltage means resulting from load voltage drop.

9. In weld control apparatus for resistance welding, a power source, welding electrodes connected to the power source and adapted for transmission of power at successive weld points of a workpiece to form a series of welds, voltage-sensitive indicating means connected to said welding electrodes for signaling the completion of a weld through said workpiece for each successive weld of the series at the time of weld completion, said indicating means being automatically adjustable to initial electrode voltage at each weld prior to the weld.

10. In weld control apparatus for resistance welding, a power source, welding electrodes connected to the power source and adapted for transmission of power at successive weld points of a workpiece to form a series of welds, and means automatically operable on the completion of each weld of the weld series and automatically adjustable to the initial maximum electrode voltage at each weld for disconnecting the power source from said electrodes.

11. In weld control apparatus for resistance welding, a power source, welding electrodes connected to the power source and adapted for transmission of power at successive weld points of a workpiece to form a series of welds, means automatically operable on the completion of each weld of the weld series and automatically adjustable to the initial electrode voltage at each weld for disconnecting the power source from said electrodes, and means for setting the normal time period of power transmission to said welds.

12. In weld control apparatus for resistance welding, a power source, welding electrodes connected to the power source and adapted for transmission of power at successive weld points of a workpiece to form a series of welds, means automatically operable on the completion of each weld of the weld series and automatically adjustable to the electrode voltage at each weld for disconnecting the power source from said electrodes, and means for setting the normal and maximum time periods of power transmission to said welds.

13. In an electric resistance welding apparatus, the combination including a power source, coacting electrodes adapted to receive a workpiece for welding treatment, energy-response means connected to said electrodes, means dependent on weld formation in the workpiece and normally independent of value of supply of welding power to said workpiece for actuating said energy-response means, and circuit connections between said source, electrodes, energy-response means and actuating means, said actuating means including a capacitor chargeable to a value directly related to the maximum power applied across the weld zone between said electrodes, and a rectifier for controlling the discharge of said capacitor to actuate said energy-response means.

14. In electric resistance welding apparatus, the combination including a power source, coacting electrodes adapted to receive a workpiece for welding treatment, energy-response means connected to said electrodes, and means dependent on weld formation in the workpiece and normally independent of value of supply of welding power to said workpiece for actuating said energy-response means, said power source supplying power for both weld formation and actuation of said energy-response means.

15. In electric resistance welding apparatus, the combination including a power source, coacting electrodes adapted to receive a workpiece for welding treatment, energy-response means connected to said electrodes, means dependent on weld formation in the workpiece and normally independent of value of supply of welding power to said workpiece for actuating said energy-response means, and circuit connections between said source, electrodes, energy-response means and actuating means, said actuating means comprising a capacitor for establishing the reference voltage value corresponding to the electrode voltage at the workpiece prior to weld fusion, and means for controlling the discharge of said capacitor to actuate said energy-response means.

16. In electric resistance welding apparatus, the combination including a power source, coacting electrodes adapted to receive a workpiece for welding treatment, energy-response means connected to said electrodes, means dependent on weld formation in the workpiece and normally independent of value of supply of welding power to said workpiece for actuating said energy-response means, and circuit connections between said source, electrodes, energy-response means and actuating means, said response-actuating means being dependent for action only on the energy flow from said source.

17. In electric resistance welding apparatus, the combination including a power source, coacting electrodes adapted to receive a workpiece for welding treatment, energy-response means connected to said electrodes, means controlled by said energy-response means for controlling supply of power from said power source to said coacting electrodes, and means dependent on weld formation in the workpiece and normally independent of value of supply of welding power to said workpiece for actuating said energy-response means, said power source supplying power for both weld formation and actuation of said energy-response means.

18. In electric resistance welding apparatus, the combination including a power source, coacting electrodes adapted to receive a workpiece for welding treatment, energy-response means connected to said electrodes, means controlled by said energy-response means for controlling supply of power from said power source to said coacting electrodes, means dependent on weld formation in the workpiece and normally independent of absolute value of supply of welding power to said workpiece for actuating said energy-response means, and circuit connections between said source, electrodes, and energy-response means, said actuating means including a device sensitive to change of energy flow through said electrodes and workpiece for controlling actuation of said energy-response means.

HERBERT D. VAN SCIVER.

REFERENCES CITED

The following references are of record in the file of this patent:

UNITED STATES PATENTS

| Number | Name | Date |
|---|---|---|
| 2,276,851 | Livingston | Mar. 17, 1942 |
| 2,373,545 | Cooper et al. | Apr. 10, 1945 |
| 1,975,997 | Whitesell | Oct. 9, 1934 |
| 2,288,567 | Heitman et al. | June 30, 1942 |
| 1,959,690 | Roth | May 22, 1934 |
| 2,011,366 | Lord | Aug. 13, 1935 |
| 2,149,558 | Stansbury et al. | Mar. 7, 1939 |
| 2,306,593 | Collom | Dec. 29, 1942 |